United States Patent [19]
Jennings, Jr.

[11] Patent Number: 4,686,430
[45] Date of Patent: Aug. 11, 1987

[54] DRIVE CIRCUIT FOR PINCUSHION CORRECTOR

[75] Inventor: James R. Jennings, Jr., Indianapolis, Ind.

[73] Assignee: RCA Corporation, Princeton, N.J.

[21] Appl. No.: 805,492

[22] Filed: Dec. 5, 1985

[51] Int. Cl.⁴ .......................................... H01J 29/56
[52] U.S. Cl. .................................................. 315/371
[58] Field of Search .............................. 315/370, 371

[56] References Cited

U.S. PATENT DOCUMENTS

| | | | |
|---|---|---|---|
| 3,649,870 | 3/1972 | Maulsby | 315/371 |
| 4,101,814 | 7/1978 | Haferl | 315/371 |

FOREIGN PATENT DOCUMENTS

| | | | |
|---|---|---|---|
| 56-58371 | 5/1981 | Japan | 315/371 |
| 59-119653 | 7/1984 | Japan | 315/371 |

OTHER PUBLICATIONS

Markus, Guidebook of Electronic Circuits, 1974, p. 649.

Primary Examiner—Theodore M. Blum
Assistant Examiner—David Cain
Attorney, Agent, or Firm—Paul J. Rasmussen; Joseph Laks; Scott J. Stevens

[57] ABSTRACT

A video display apparatus includes a diode modulator for correcting side pincushion raster distortion. The diode modulator drive circuit produces a vertical deflection rate parabolic voltage that modulates the horizontal deflection current to effect pincushion correction. The drive circuit includes a transistor that has its base bias established by the combination of a width control resistor and a diode. The diode has the same thermal characteristics as the transistor to provide accurate temperature compensation. A resistor is connected between the emitter of the transistor and a supply voltage to change the transistor bias point in order to enable the transistor to be cutoff.

6 Claims, 1 Drawing Figure

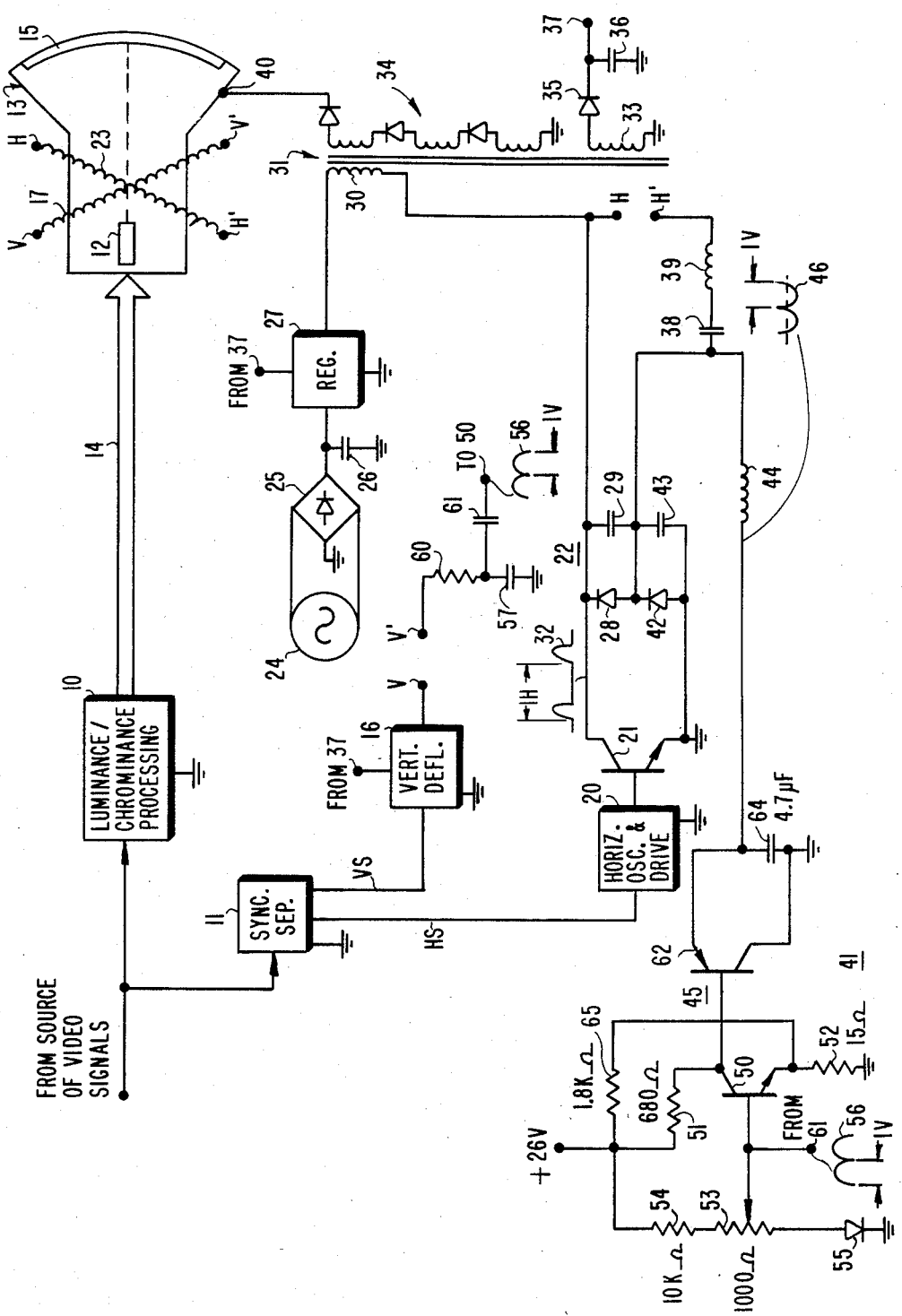

DRIVE CIRCUIT FOR PINCUSHION CORRECTOR

This invention relates to raster distortion correction for video display apparatus and, in particular, to control of side pincushion distortion correction circuits.

The cathode ray tube (CRT) of a video display apparatus such as a television receiver or a computer monitor produces one or more electron beams that are scanned or deflected in a predetermined pattern to form a raster on the faceplate display screen of the CRT. The difference between the electron beam scanning radius and the CRT faceplate contour causes the beams to be deflected a further distance to the corners than to the top, bottom or sides of the display screen, resulting in a distortion that causes the raster to appear inwardly bowed, or pincushion shaped, at the top, bottom and sides, rather than the desired rectangular shape.

Correction of this pincushion raster distortion may be accomplsihed by changing the wire distribution of the deflection yoke coils in order to modify the harmonic content of the deflection fields, a technique known according to third order aberration theory. Correction in this manner, particularly with respect to side pincushion distortion, may result in a deflection yoke that is complex, and difficult and costly to manufacture. Additionally, for some applications, such as computer monitors, modification of the deflection field harmonic content may be undesirable. In such a case, modification of the deflection signal waveform via electrical circuitry may be used to produce the desired pincushion correction. Side pincushion distortion may be corrected, for example, by varying the magnitude of the horizontal or line-rate deflection current at a vertical, or field-rate deflection rate.

One technique for providing the described vertical rate change in the horizontal deflection current is through the use of a diode modulator. It is desirable, however, that the diode modulator be economical yet have stable, predictable operating characteristics over a wide range of operating conditions.

In accordance with an aspect of the present invention, a circuit for correcting pincushion distortion in a video display apparatus comprises a first transistor having base, emitter and collector terminals. A source of periodically field-rate varying signals is applied to the base terminal. A second transistor has a first terminal that is coupled to the collector terminal and a second terminal that is coupled to a deflection winding for modifying the current flowing in the deflection winding in response to the periodically field-rate varying signal applied to the base terminal of the first transistor. An adjustable voltage divider includes a semiconductor device and is coupled to the base terminal and to a voltage supply terminal for establishing a DC bias point for the first transistor. An impedance is coupled to the emitter terminal and to the voltage supply terminal for changing the DC bias point of the first transistor to enable the first transistor to be cut off at a predetermined adjustment point of the voltage divider.

In the accompanying drawing, the sole FIGURE illustrates a block and schematic drawing of a portion of a video display apparatus incorporating a pincushion correction circuit in accordance with an aspect of the present invention.

Referring to the FIGURE, there is shown a portion of a color video display apparatus in which video signal information from a source of video signals (not shown), such as a television tuner, is applied to luminance and chrominance processing circuitry 10. In the FIGURE, the video signal information is illustratively supplied in the form of a composite video signal, which includes horizontal and vertical synchronizing information, that is also applied to a synchronizing pulse (sync) separator 11.

Luminance and chrominance processing circuitry 10 illustratively produces the red, green and blue color drive signals that are applied to the electron gun assembly 12 of cathode ray tube (CRT) 13 along a conductor 14. Electron gun assembly 12 illustratively generates three horizontally aligned electron beams which are caused to strike a phosphor display screen 15 located on the front panel of CRT 13.

The composite video signal is processed by sync separator 11 to produce vertical or field-rate sync pulses that are applied, via a conductor VS, to a vertical deflection circuit 16 that generates vertical deflection current via terminals V and V' in a vertical deflection winding 17 located on the neck of CRT 13.

Sync separator 11 also produces horizontal or line-rate sync pulses that are applied via a conductor HS to horizontal oscillator and drive circuitry 20l Horizontal oscillator and drive circuitry 20 produces horizontal rate switching signals for output transistor 21 of horizontal output circuit 22, which also comprises a horizontal deflection winding 23, a damper diode 28, a retrace capacitor 29, an S-shaping capacitor 38, and a linearity correction coil 39. Horizontal output circuit 22 generates horizontal deflection current via terminals H and H' in horizontal deflection winding 23 which is located on the neck of CRT 13. The horizontal and vertical deflection currents in windings 23 and 17, respectively, generate orthogonal electromagnetic fields that deflect the electron beams in a predetermined pattern to form a raster on display screen 15.

Power for the video display apparatus is supplied from a source of AC voltage 24 which is connected to a rectifying circuit 25 that provides via a filter capacitor 26 a source of unregulated DC voltage. This unregulated voltage is applied to a voltage regulator 27, which may be of conventional design, in order to produce a regulated DC voltage that is applied to one terminal of a primary winding 30 of power transformer 31. The other terminal of primary winding 30 is connected to the collector of horizontal output transistor 21. Flyback pulses 32 produced due to the switching of transistor 21 appear across winding 30 which, by transformer action, causes voltages to be developed across secondary winding 33 and high voltage winding 34. The voltage across secondary windine 33 is rectified and filtered by diode 35 and capacitor 36 to produce a regulated DC voltage at a terminal 37 that is illustratively used to power vertical deflection circuit 16 and to provide feedback to voltage regulator circuit 27. Other secondary windings (not shown) may be provided in order to produce different voltage level to power other load circuits. High voltage winind 34 produces a voltage of the order of 25 KV that is applied to the high voltage or ultor terminal 40 of CRT 13.

The video display apparatus of the FIGURE also incorporates a diode modulator circuit 41 that provides correction for side pincushion raster distortion. Diode modulator circuit 41 comprises a diode 42, a modulator retrace capacitor 43, a modulator inductor 44 and a drive circuit 45. Diode modulator circuit 41 generates a periodic voltage signal that is modulated or varied at the vertical deflection or field-rate. This modulated voltage 46 is applied via S-capacitor 38 and linearity coil 39 to one terminal of horizontal deflection winding 23. Since the deflection current, which determines the amount of electron beam deflection, is itself determined by the magnitude of the voltage applied across the deflection winding, the effect of the voltage signal 46 is to vary the deflection current, and hence the scan amplitude at a vertical deflection rate in a manner that corrects side pincushion distortion. Diode 42 is provided to conduct modulator inductor current during a portion of the horizontal trace interval. Modulator retrace capacitor 43 and modulator inductor 44 resonate during the horizontal retrace interval in a manner similar and at a frequency equal to that of retrace capacitor 29 and deflection winding 23.

Drive circuit 45 produces the desired modulated voltage signal 46 in an economical and efficient manner. Drive circuit 45 comprises a transistor 50 having its collector connected via a bias resistor 51 to a voltage supply terminal illustratively supplying of the order of +26 volts. The emitter of transistor 50 is connected via a bias ressitor 52 to a point of reference potential, illustratively shown as ground. The base of transistor 50 is coupled to the wipre of a variable resistor 53, which has one terminal coupled through a resistor 54 to the +26 volt supply terminal and the other terminal connected to the anode of a diode 55 with the cathode of diode 55 connected to ground.

A periodic vertical deflection rate parabolic voltage signal 56, developed across a capacitor 57 in response to vertical deflection current flow through deflection winding 17 and a sampling resistor 60, is applied to the base of transistor 50 via a coupling capacitor 61.

The collector of transistor 50 is connected to the base of a transistor 62, designated 2SB834, manufactured by Toshiba, for example. The collector of transistor 62 is coupled to ground. The emitter of transistor 62 is the output of the diode modulator drive circuit 45 and is coupled to modulator inductor 44. A horizontal rate bypass capacitor 64 is coupled between the emitter and collector of transistor 62. The operation of drive circuit 45 is as follows.

Diode 55 and the portion of variable resistor 53 located between the wiper and diode 55, in response to current flow from the +26 volt supply, act to establish the DC base bias point for transistor 50. Diode 55, for example designated 1N4148, manufactured by ITT Corp., is chosen to comprise the same semiconductor material, illustratively silicon, as that of transistor 50, for example designated MPSA20, manufactured by Motorola Corp., so that the thermal characteristics of diode 55 track the thermal characteristics of the base-emitter junction of transistor 50 as closely as possible. Improper matching of thermal characterisitcs between diode 55 and transistor 50 may result in undesirable changes in the output of transistor 50 in response to temperature changes so that undesirable changes in raster width may occur. Use of a silicon type diode 55 permits the DC base bias point to change to compensate for temperature dependent changes in the operating characteristics of transistor 50 in order to maintain substantiallys table raster width during warmup of the video display apparatus, for example.

As stated previously, variable resistor 53 is used to select raster width, for example to match the circuit of the FIGURE to a particular cathode ray tube size or type. The presence of vertical rate voltage signal 56 therefore controls the conduction of transistor 50 in accordance with the base bias point established by resistor 53 and diode 55 in order to periodically vary the raster width, e.g., decrease the width at the top and bottom of the raster, in order to effect correction of side pincushion raster distortion. Variable resistor 53 is selected to nominally have a significant portion of its resistance range located between the wiper and diode 55. Slight changes in raster width to accommodate different tubes will therefore result in a relatively small percentage of resistance change between the wiper and diode 55. The amount and character of the pincushion correction provided will therefore remain substantially constant with raster width variations.

It is desirable to be able to render transistor 50 nonconductive during assembly and testing of the video display apparatus so that the operation of the horizontal deflection circuit may be observed without the contribution of diode modulator 41. In particular, a measure of the DC voltage level applied to horizontal deflection winding 23 can indicate, by a deviation from an expected level, the potential malfunction of S-shaping capacitor 38, modulator inductor 44, or modulator retrace capacitor 43, for example. If transistor 50 is not rendered nonconductive or cutoff, such determination is difficult or impossible.

Transistor 50 is normally rendered nonconductive by adjusting variable resistor 53 so as to decrease the bias on the base of transistor 50 as much as possible. The presence of diode 55, howver, being of the same semiconductor material as transistor 50, may exhibit a forward voltage drop of such a magnitude that transistor 50 can not be cutoff even with resistor 53 set at its minimum value adjustment point. The use of a lower forwad drop diode, such as a germanium diode, is known to be used to enable the drive transistor to be cutoff. The use of a differnet semiconductor material device than that of the drive transistor, may result in undesirable changes in raster width as a result of temperature changes. In accordance with a novel aspect of the present invention, a resistor 65 is coupled between the emitter of transistor 50 and the +26 volt supply in order to raise the mitter DC bias point of transistor 50 so that the emitter DC bias exceeds the base DC bias when resistor 53 is adjusted to its minimum adjustment point. Transistor 50 may then be rendered nonconductive by adjustment of resistor 53 in order to perform the previously described diagnostic analysis.

The drive circuit 45 of diode modulator 41 therefore provides excellent thermal stability, predictable pincushion correction with raster width changes, and the desirable ability to permit the diode modulator to be inactivated in order to test the performance and condition of the deflection components.

What is claimed is:
1. Means for correcting side pincushion distortion in a video display apparatus comprising:
   a first transistor having base, emitter and collector terminals;
   a source of periodically field-rate varying input signals coupled to said base terminal;
   a second transistor having a first terminal coupled to said collector temrinal and having a second terminal coupled to a line deflection winding for modifying the current flowing in said line deflection winding in response to said periodically field-rate varying input signal applied to said base terminal of said first transistor;

adjustable voltage divider means, including semiconductor means, coupled to said base terminal and to a voltage supply terminal for establishing a voltage level bias point for said first transistor; and impedance means coupled to said emitter terminal and to said voltage supply terminal for increasing the voltage level of said bias point of said first transistor to enable said first transistor to be rendered nonconductive at a predetermined adjustment point of said adjustable voltage divider means.

2. The arrangement of defined in claim 1, wherein said semiconductor means exhibits the same thermal characteristics as said first transistor.

3. The arrangement defined in claim 2, wherein said semiconductor means provides thermal compensation for said first transistor in order to maintain the amplification of said first transistor constant as the temperature of said first transistor changes.

4. The arrangement defined in calim 1, wherein said semiconductor means comprises a diode having the same semiconductor material as said first transistor.

5. The arrangement defined in claim 4, wherein said diode and said emitter terminal of said first transistor are coupled to a point of referenc epotential with said diode coupled in parallel with said base-emitter junction of said first transistor in order to increase the DC bias of said base terminal of said first transistor.

6. The arrangment defined in claim 5, wherein said impedance means increases the DC bias of said emitter terminal to enable said emitter terminal DC bias to exceed said base terminal DC bias when said voltage divider means is at said predtermined adjustment point.

* * * * *